United States Patent
Kajio et al.

(10) Patent No.: US 11,588,160 B2
(45) Date of Patent: Feb. 21, 2023

(54) FUEL CELL GAS/LIQUID SEPARATOR INCLUDING FIRST CONTAINER FOR NEGATIVE ELECTRODE EXHAUST AND SECOND CONTAINER FOR POSITIVE ELECTRODE EXHAUST

(71) Applicant: AISIN CORPORATION, Aichi (JP)

(72) Inventors: Katsuhiro Kajio, Kariya (JP); Toshihiro Kobayashi, Kariya (JP)

(73) Assignee: AISIN CORPORATION, Kariya (JP)

( * ) Notice: Subject to any disclaimer, the term of this patent is extended or adjusted under 35 U.S.C. 154(b) by 274 days.

(21) Appl. No.: 16/882,857

(22) Filed: May 26, 2020

(65) Prior Publication Data

US 2021/0098803 A1    Apr. 1, 2021

(30) Foreign Application Priority Data

Sep. 26, 2019  (JP) .............................. JP2019-175570

(51) Int. Cl.
  *H01M 8/04119*  (2016.01)
  *B01D 45/08*    (2006.01)

(52) U.S. Cl.
  CPC ........ *H01M 8/04156* (2013.01); *B01D 45/08* (2013.01); *H01M 2250/20* (2013.01)

(58) Field of Classification Search
  CPC .......... H01M 8/04156; H01M 8/04164; B01D 45/08

USPC ............................................. 429/414; 55/432
See application file for complete search history.

(56) References Cited

U.S. PATENT DOCUMENTS

2014/0227618 A1 *  8/2014  Handgraetinger ......................... H01M 8/04149
                                                    429/414
2019/0363375 A1 *  11/2019  Hosoi .............. H01M 8/04164

FOREIGN PATENT DOCUMENTS

| JP | 2016-219415 A | 12/2016 |
| JP | 2018-041539 A | 3/2018 |
| JP | 2018041539 A * | 3/2018 |
| JP | 2019-093359 A | 6/2019 |

* cited by examiner

*Primary Examiner* — Sean P Cullen (74) *Attorney, Agent, or Firm* — Oblon, McClelland, Maier & Neustadt, L.L.P.

(57) ABSTRACT

A gas and liquid separator includes a first separating portion configured to separate a liquid droplet from a first exhaust gas discharged from a negative electrode of a fuel cell, a first container accommodating the first separating portion, a first storage reservoir storing water flowing down from the first separating portion, a second container provided at a lower side of the first storage reservoir, a second storage reservoir provided at a lower portion of the second container, and a valve apparatus including a valve discharging water stored in the first storage reservoir, wherein a second exhaust gas discharged from a positive electrode flows in the second container, and water discharged from the first storage reservoir is stored in the second storage reservoir.

5 Claims, 6 Drawing Sheets

FUEL CELL GAS/LIQUID SEPARATOR INCLUDING FIRST CONTAINER FOR NEGATIVE ELECTRODE EXHAUST AND SECOND CONTAINER FOR POSITIVE ELECTRODE EXHAUST

CROSS REFERENCE TO RELATED APPLICATIONS

This application is based on and claims priority under 35 U.S.C. § 119 to Japanese Patent Application 2019-175570, filed on Sep. 26, 2019, the entire content of which is incorporated herein by reference.

TECHNICAL FIELD

This disclosure generally relates to a gas and liquid separator for a fuel cell system to be mounted on, for example, a vehicle.

BACKGROUND DISCUSSION

A fuel cell system may include a gas and liquid separator of off-gas. In particular, a fuel cell system mounted on a vehicle may have a case in which a drain passage of the gas and liquid separator freezes and cannot drain water during winter season, for example. The off-gas is exhaust gas exhausted from a fuel cell and temperature of the off-gas is higher than outside temperature. The off-gas includes water (so-called produced water) generated by oxidation reaction (power generation), and/or water that has humidified fuel gas and/or air (oxygen gas), for facilitating the oxidation reaction.

A known fuel cell system is described in JP2018-041539A (which will be referred to also as Patent reference 1). The known fuel cell system of Patent reference 1 includes a gas and liquid separator which separates the produced water or generated water from the off-gas and stores the produced water, a produced water discharge passage extending from a bottom portion of equipment of the gas and liquid separator, and a discharge valve discharging the produced water from the produced water discharge passage. The discharge valve includes a valve body opening and closing the produced water discharge passage, and an actuating equipment portion actuating the valve body for opening and closing a flow passage of the produced water discharge passage. The bottom portion of equipment and the produced water discharge passage of the known gas and liquid separator are arranged in a pipe of an off-gas discharge pipe. The actuating equipment portion is arranged at an up-stream side relative to the valve body, in the pipe of the off-gas discharge pipe.

As described above, the temperature of the off-gas is higher than the outside temperature. Accordingly, at the known fuel cell system of Patent reference 1, the bottom portion of the equipment of the gas and liquid separator, the produced water discharge passage, and the discharge valve are arranged in the pipe of the off-gas discharge pipe, thereby facilitating heat transmission from the off-gas to the bottom portion of equipment of the gas and liquid separator, to the produced water discharge passage, and to the discharge valve. Thus, even in a case where the produced water freezes at the bottom portion of equipment of the gas and liquid separator, the produced water discharge passage, and the actuating equipment portion of the discharge valve before the actuation of the fuel cell, the frozen produced water can unfreeze quickly in association with a start-up of the fuel cell.

At the known fuel cell system described in, for example, Patent reference 1, the produced water is configured to be discharged into a pipe of the off-gas (for example, cathode off-gas). Accordingly, the produced water is released to an outside from time to time together with the exhaust gas (the cathode off-gas). However, if the produced water is discharged as it is together with the exhaust gas, slipperiness of a road surface is increased by, for example, freeze. Thus, timings of the release need to be controlled. At the fuel cell system for a vehicle, a turbine may be provided on an off-gas flow path for increasing pressure of supply gas, and the turbine may be subject to failure when a liquid droplet of the produced water collides with a blade of the turbine.

A need thus exists for a gas and liquid separator which is not susceptible to the drawback mentioned above.

SUMMARY

According to an aspect of the disclosure, a gas and liquid separator includes a first separating portion configured to separate a liquid droplet from a first exhaust gas discharged from a negative electrode of a fuel cell, a first container accommodating the first separating portion in an internal space portion, a first storage reservoir provided at a lower portion of the first container and storing water flowing down from the first separating portion, a second container provided at a lower side of the first storage reservoir to be adjacent to the first storage reservoir, a second storage reservoir provided at a lower portion of the second container, and a valve apparatus including a valve discharging water stored in the first storage reservoir when the valve is open, wherein a second exhaust gas discharged from a positive electrode of the fuel cell flows in an internal space portion of the second container, and water discharged from the first storage reservoir is stored in the second storage reservoir.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

An embodiment of the present disclosure will be described with reference to the drawings.

Figure 1:
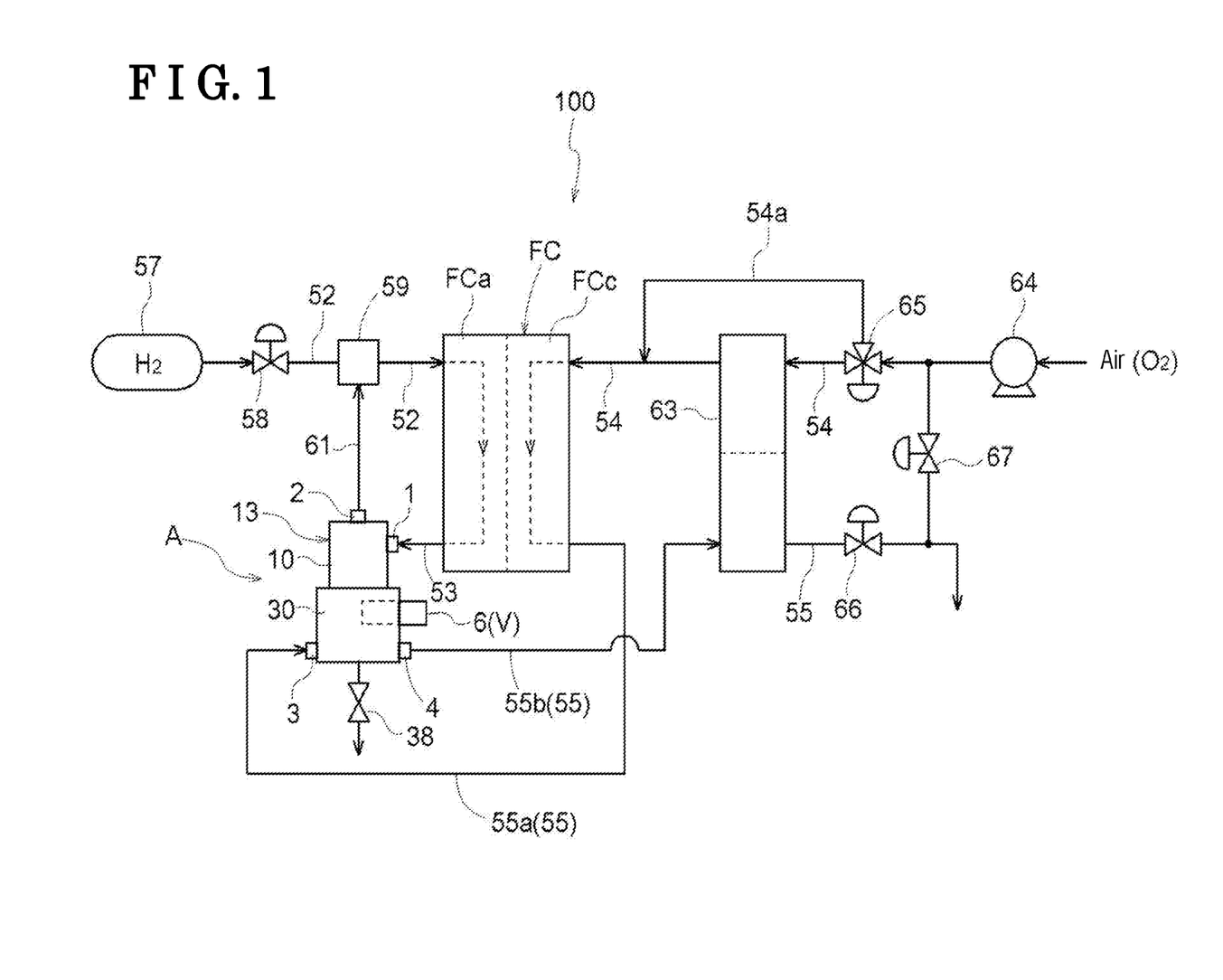
FIG. 1 is an explanatory view of a whole configuration of a fuel cell unit according to an embodiment disclosed here.

FIG. 1 illustrates a fuel cell unit 100 to be mounted on a fuel cell vehicle. The fuel cell unit 100 includes a fuel cell FC. The fuel cell FC includes an anode FCa (an example of a negative electrode) to which gas (so-called anode gas, which will be hereinafter described as "first gas") including hydrogen gas serving as fuel gas, and a cathode FCc (an example of a positive electrode) to which gas (so-called cathode gas, which will be hereinafter described as "second gas") including oxygen gas.

The anode FCa is connected to a first gas flow passage 52 through which the first gas is supplied to the anode FCa, and connected to a first exhaust gas flow passage 53 through which exhaust gas (so-called anode off-gas, which will be hereinafter described as a first exhaust gas) from the anode FCa is discharged.

A tank 57 storing therein the hydrogen gas serving as an ingredient of the first gas is connected to the first gas flow passage 52, and a flow rate control valve 58 controlling a supply amount of the hydrogen gas, and an ejector 59 are provided from the tank 57 towards the anode FCa in the stated order.

A gas and liquid separator A is connected to the first exhaust gas flow passage 53. The gas and liquid separator A includes a first gas and liquid separating portion 13 (an example of a first separating portion, refer to FIG. 2) which separates liquid droplets from the first exhaust gas. The first exhaust gas of which the liquid droplets have been separated at the gas and liquid separator A is sucked or absorbed to the ejector 59 via a reduction flow passage 61. The gas and liquid separator A will be described in detail below.

The cathode FCc is connected to a second gas flow passage 54 through which the second gas is supplied to the cathode FCc, and to a second exhaust gas flow passage 55 through which exhaust gas (so-called cathode off-gas, which will be hereinafter referred to as a second exhaust gas) from the cathode FCc is discharged.

An air pump 64 supplying air serving as the second gas is connected to the second gas flow passage 54, and a switch valve 65, a humidifier 63 arranged in a region lying from the second flow passage 54 to the second exhaust gas flow passage 55, and a bypass flow passage 54a bypassing the humidifier 63 are provided from the air pump 64 towards the cathode FCc in the stated order. The switch valve 65 is a three-way valve configured to switch between a state in which the second gas is supplied to the humidifier 63 and a state in which the second gas flows into the bypass flow passage 54a. The humidifier 63 is configured as a temperature and humidity exchange type, and takes in water and heat from the second exhaust gas of the second exhaust gas flow passage 55 and provides the water and heat, which were taken in, to the second gas of the second gas flow passage 54.

On the flow path of the second exhaust gas flow passage 55, the gas and liquid separator A, the humidifier 63, and a discharge control valve 66 controlling discharge of the second exhaust gas are provided in the stated order from the cathode FCc. A bypass valve 67 is provided between the second gas flow passage 54 and the second exhaust gas flow passage 55. The bypass vale 67 allows the gas to flow between the second gas flow passage 54 and the second exhaust gas flow passage 55.

(Operation of the fuel cell) At the fuel cell unit 100, electric power is generated at the fuel cell FC in a manner that the hydrogen gas of the tank 57 is supplied from the first gas flow passage 52 to the anode side of the fuel cell FC under the control of the flow rate control valve 58, and at the same time, the second gas is supplied from the second gas flow passage 54 to the cathode side of the fuel cell FC due to the actuation of the air pump 64.

During the electric power generation, the first exhaust gas is discharged from the anode FCa to the first exhaust gas flow passage 53, and the water included or contained in the first exhaust gas is separated by the gas and liquid separator A. The first exhaust gas from which the water has been separated returns to the ejector 59 via the reduction flow passage 61, and then is supplied to the first gas flow passage 52 from the ejector 59. The separated water is temporarily stored inside the gas and liquid separator A, and is discharged to the outside when an on-off valve 38 is released or opened.

During the electric power generation, the second exhaust gas is discharged from the cathode FCc to the second exhaust gas flow passage 55. Part of the second exhaust gas, which was discharged to the second exhaust gas flow passage 55 and then passed through the gas and liquid separator A, is discharged to the outside via the discharge control valve 66. When an output of the fuel cell needs to be reduced quickly, the bypass valve 67 is opened to discharge the second exhaust gas.

At the humidifier 63, the moisture or water and the heat are taken from the second exhaust gas, and the moisture and the heat are provided to the second gas. Thus, the second gas, which comes to include the moisture and of which the temperature has increased, is supplied to the cathode-side of the fuel cell FC from the second gas flow passage 54.

Figure 2:
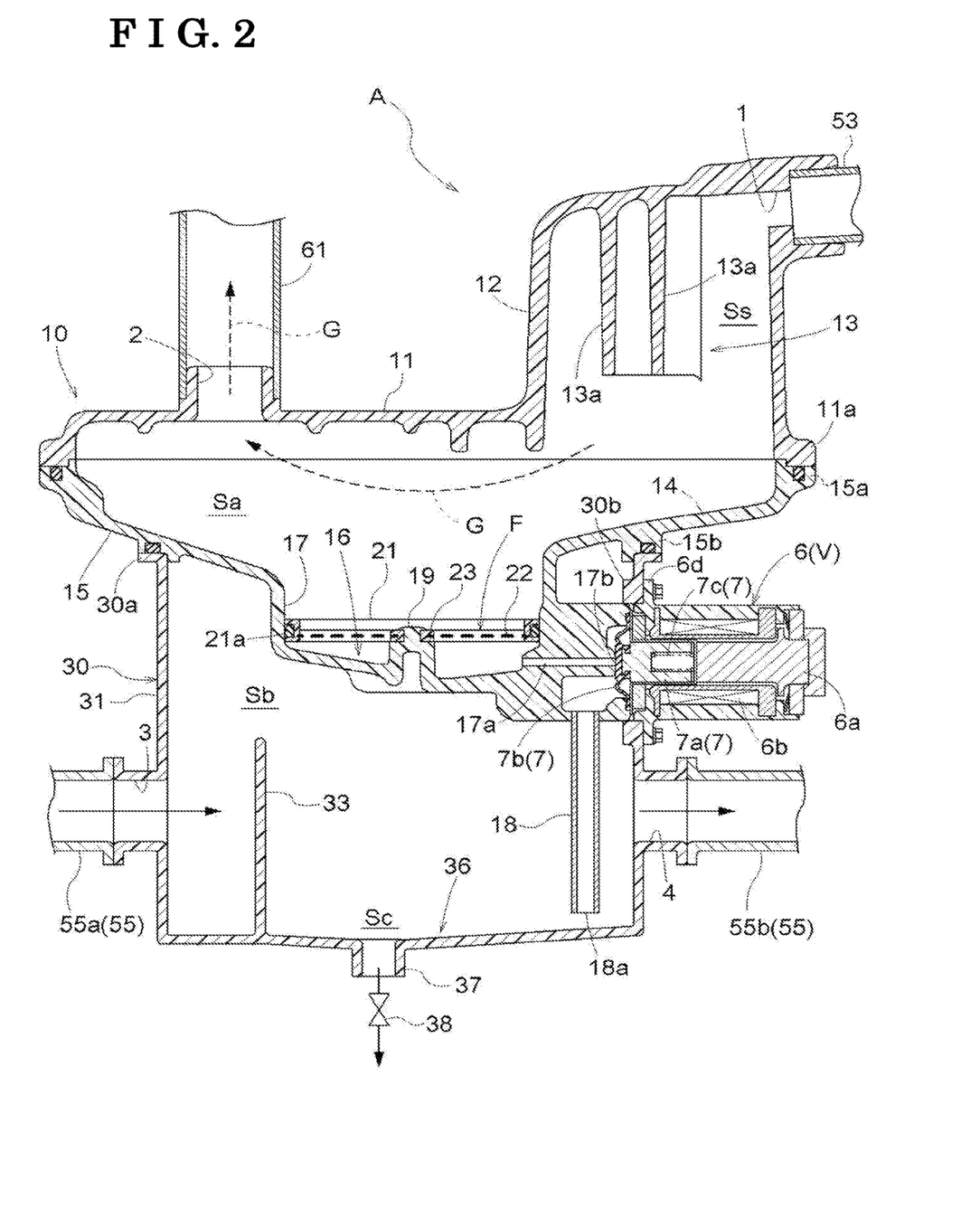
FIG. 2 is a longitudinal sectional view for schematically explaining a configuration of a gas and liquid separator according to the embodiment.

(Gas and liquid separator) As illustrated in FIG. 2, the gas and liquid separator A includes a first container 10, a valve unit V discharging the water stored in the first water storage portion 16, and a second container 30. The first container 10 includes a first introduction inlet 1 introducing the first exhaust gas, a first discharge outlet 2 discharging the introduced first exhaust gas, the first gas and liquid separating portion 13 separating the liquid droplets (water) from the first exhaust gas, and a first water storage portion 16 (an example of a first storage reservoir) storing therein the separated water. The second container 30 includes a second introduction inlet 3 (an example of an introduction port) introducing the second exhaust gas, a second discharge outlet 4 (an example of a discharge port) discharging the introduced second exhaust gas, a collision plate 33 (an example of a second separating portion), and a second water storage portion 36 (an example of a second storage reservoir). The second container 30 is provided at a lower side relative to the first container 10 in the vertical direction to be adjacent to the first container 10. As will be described later, the second container 30 is warmed by the second exhaust gas flowing in the second container 30.

(First container) The first container 10 includes an upper housing 11 including a lid shape and a lower housing 15 including a bottomed cylindrical shape. The upper housing 11 includes a first flange 11a. The lower housing 15 includes a second flange 15a provided at an opening end (an upper end) of the lower housing 15 and a third flange 15b provided at an outer periphery of the lower housing 15. The upper flange 11a of the upper housing 11 and the second flange 15a of the lower housing 15 are connected or joined to each other with a fastening member including, for example, a bolt and/or a clamp, and thus the first container 10 includes an internal space portion (which will be hereinafter referred to as a first space portion Sa). In the first container 10, the first introduction inlet 1 and the first discharge outlet 2 are in fluid communication with the first space portion Sa, and a discharge flow passage 17*a* is in fluid communication with the first water storage portion 16. The first container 10 includes, in the first space portion Sa, the first gas and liquid separating portion 13 and a filtration unit F.

Each of the upper housing 11 and the lower housing 15 is made of resin. A seal material is provided at a boundary surface between the first flange 11*a* and the second flange 15*a* to be sandwiched therebetween. Each of the upper housing 11 and the lower housing 15 may be made of metal (metal alloy) including aluminum, for example.

The upper housing 11 includes the first introduction inlet 1 and the first discharge outlet 2 which are formed such that the first water storage portion 16 is interposed between the first introduction inlet 1 and the first discharge outlet 2 when viewed in a plan view (top view). The first discharge outlet 2 is formed to penetrate the upper housing 11 in an upper and lower direction. A cylindrical introduction body 12 including a cylindrical wall portion protruding upward is formed integrally with the upper housing 11, and a separation space portion Ss is formed inside the cylindrical introduction body 12. The first introduction inlet 1 is provided at an upper end portion of the cylindrical introduction body 12, and the first gas and liquid separating portion 13 is arranged in the separation space portion Ss inside the cylindrical introduction body 12.

The first exhaust gas flow passage 53 is connected to the first introduction inlet 1. The reduction flow passage 61 is connected to the first discharge outlet 2.

Figure 3:
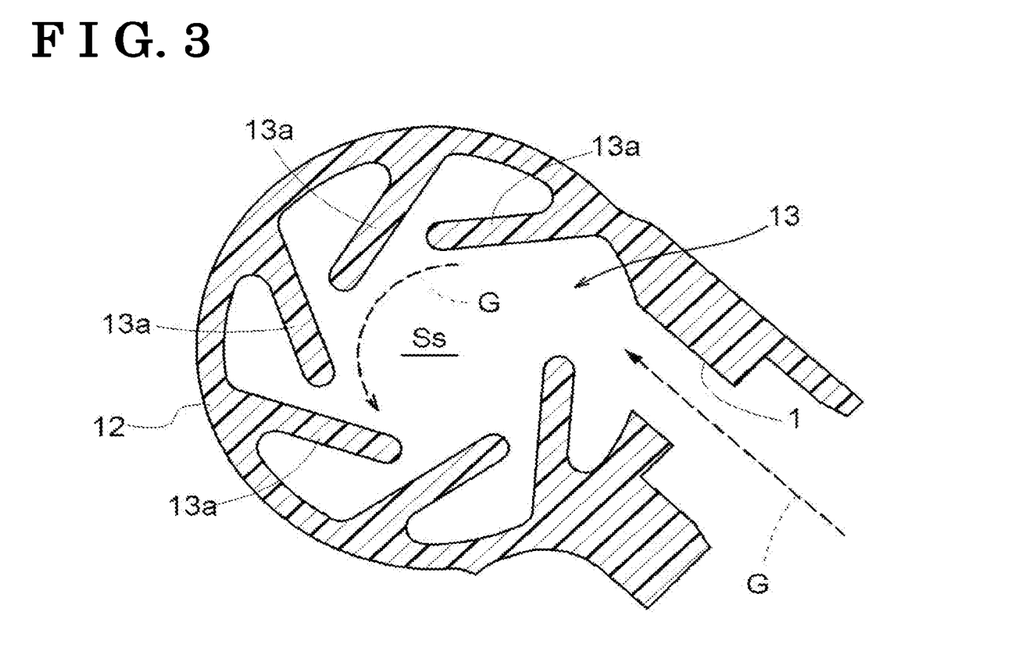
FIG. 3 is a transverse sectional view of a part of a first gas and liquid separating portion, the part which includes an introduction inlet, according to the embodiment.
Figure 4:
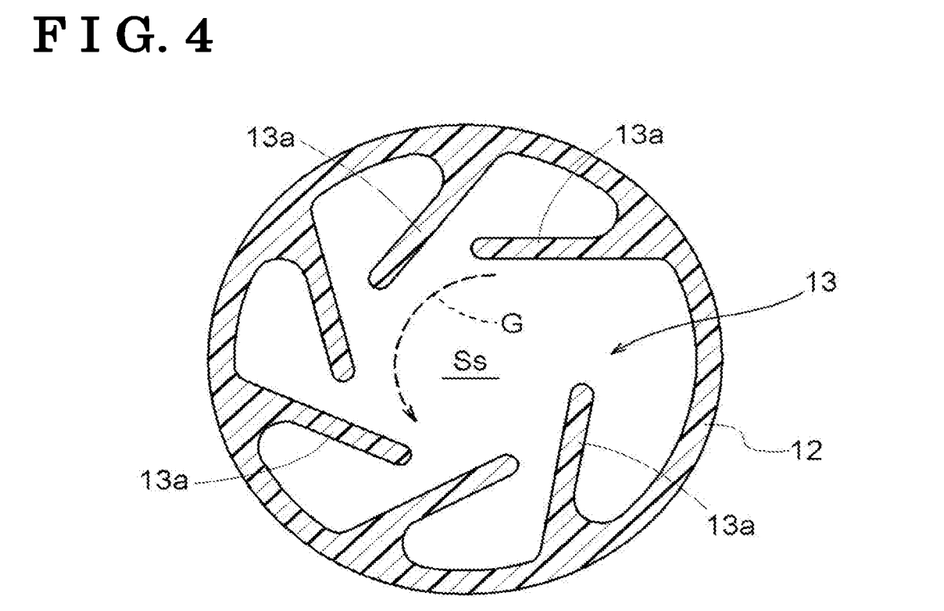
FIG. 4 is a transverse sectional view of an intermediate portion of the first gas and liquid separating portion of the embodiment.

As illustrated in FIGS. 2 to 4, the separation space portion Ss is formed as a space portion including a circular-columnar shape since the cylindrical introduction body 12 includes an inner wall having a circular shape when viewed in a plan view. The first gas and liquid separating portion 13 includes plural (for example, six in the drawings of the embodiment) collision walls 13*a* (an example of a first separating portion) provided along the inner wall of the cylindrical introduction body 12 integrally with the cylindrical introduction body 12. The first exhaust gas supplied from the first introduction inlet 1 collides with the plural collision walls 13*a*, and the liquid droplets included or contained in the first exhaust gas are separated in a manner that the liquid droplets attach, as water droplets, to the collision walls 13*a* due to an inertial collision. Then, the separated water is flows down from the collision walls 13*a*.

The first introduction inlet 1 is arranged in the vicinity of upper ends of the plural collision walls 13*a*. The first introduction inlet 1 is arranged in a manner that the first exhaust gas is sent in a tangential direction following along an inner periphery of the separation space portion Ss as illustrated in FIG. 3 and obliquely downwardly as illustrated in FIG. 2. According to the posture of the first introduction inlet 1 allowing the above-described introduction of the first exhaust gas, when the first exhaust gas is introduced from the first exhaust gas flow passage 53 in a direction indicated with arrows in FIGS. 2 and 3, a swirling flow (a swirl in the counterclockwise direction in FIGS. 3 and 4) is generated in the separation space portion Ss inside the cylindrical introduction body 12. The first introduction inlet 1 may be arranged at a position higher than the position of the first introduction inlet 1 illustrated in FIG. 2 because a separation performance of the water is enhanced by arranging the first introduction inlet 1 at a position higher than the plural collision walls 13*a*.

Specifically, the first gas and liquid separating portion 13 includes a positional relationship where a flow-in direction of the first exhaust gas from the first introduction inlet 1 and the collision walls 13*a* are arranged such that the first exhaust gas supplied from the first introduction inlet 1 into the separation space portion Ss first collides with one of the plural collision walls 13*a*. Further, angles of the plural collision walls 13*a* are set such that the first exhaust gas that has collided with the one of the plural collision walls 13*a* is made to flow towards the adjacent collision wall 13*a*. Accordingly, the first exhaust gas supplied from the first introduction inlet 1 into the separation space portion Ss collides with the plural collision walls 13*a* repeatedly while swirling in the separation space portion Ss, and then swirls down to a lower portion of the separation space portion Ss.

Every time the first exhaust gas collides with the collision walls 13*a*, the liquid droplets included in the first exhaust gas collide with the collision walls 13*a* due to the inertia force and then attach to the collision walls 13*a*. The liquid droplets attached to the collision walls 13*a* flow down to the lower housing 15. The first exhaust gas from which the water droplets have been separated flows, as a gas flow G, in a direction towards the first discharge outlet 2 as indicated with the arrow in FIG. 2, and then is discharged upwardly from the first discharge outlet 2.

As illustrated in FIG. 1, the lower housing 15 includes a water storage wall 17 including a bottomed cylindrical shape extended downwards from a central portion of the lower housing 15. The lower housing 15 includes a flow-down wall 14 formed at a lower side of the separation space portion Ss of the lower housing 15. The flow-down wall 14 includes an inclined posture in which the closer the flow-down wall 14 is to the water storage wall 17, the lower the flow-down wall 14 becomes. The lower housing 15 includes the valve unit V provided at an outer surface of a lower portion of the water storage wall 17. The first water storage portion 16 is formed in a space portion surrounded by the water storage wall 17 and opening upwards. The filtration unit F removing a foreign material included in the water is provided at an upper portion of the first water storage portion 16. At least a portion of the first water storage portion 16 (the water storage wall 17) is arranged to be lower than the third flange 15*b*, and arranged (accommodated) to be adjacent to an internal space portion (which will be hereinafter referred to as a second space portion Sb) of the second container 30 that will be described later. The water storage wall 17 serves as a part of a wall surface configuring the second space portion Sb. Accordingly, the first water storage portion 16 is warmed by the second exhaust gas due to heat conduction via the water storage wall 17.

The water that has flowed downwardly from the first gas and liquid separating portion 13 (the collision walls 13*a*) flows from the flow-down wall 14 down to the first water storage portion 16, and then is temporarily stored in the first water storage portion 16.

Figure 5:
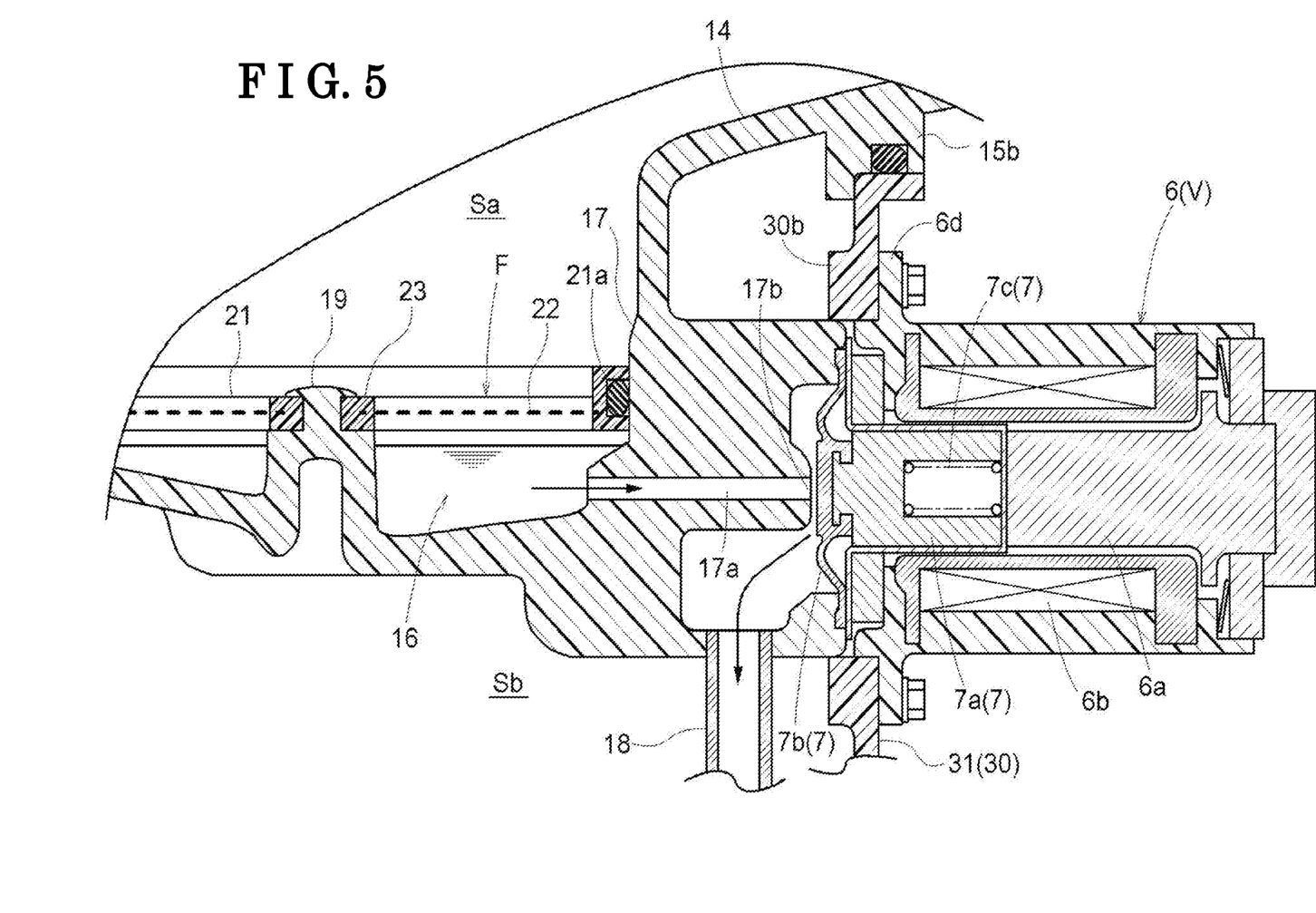
FIG. 5 is a longitudinal sectional view of a valve unit and the periphery thereof according to the embodiment.

As illustrated in FIGS. 2 and 5, the water storage wall 17 is provided with the discharge flow passage 17*a*. The discharge flow passage 17*a* is in fluid communication with a drain pipe 18 via a valve apparatus 7 of the valve unit V, which will be described later. The discharge flow passage 17*a* is arranged (formed) in the vicinity of the second space portion Sb of the second container 30, and is warmed or heated by the second exhaust gas.

The drain pipe 18 is arranged (accommodated) in the second space portion Sb and is warmed by the second exhaust gas. The drain pipe 18 includes one end portion positioned at a side of the valve apparatus 7 and the other end portion other than the side of the valve apparatus 7. A drain port 18*a* (the other end portion of the drain pipe 18) of the drain pipe 18 is positioned in an internal space portion (which will be hereinafter referred to as a third space portion Sc) of the second water storage portion 36 of the second container 30 that will be described later, and introduces (discharges) the water incoming from the discharge flow passage 17a to the second water storage portion 36.

As illustrated in FIG. 2, the filtration unit F is a unit that filters the water flowing into the first water storage portion 16. The foreign materials included in the water are removed by the filtration unit F, and thus the discharge flow passage 17a, the valve unit V and the drain pipe 18 are prevented from being clogged and/or polluted, with the foreign material.

As illustrated in FIG. 2, the filtration unit F includes an annular frame 21, a filter 22 and a fixing ring 23. The annular frame 21 is made of resin and is embedded in the water storage wall 17. The filter 22 is formed of mesh material made by using metal wire or nylon, and is provided at an inner periphery of the annular frame 21 in a tensioned state. The fixing ring 23 is made of resin and arranged at a central region of the filter 22. A seal 21a including a ring shape is embedded in an annular groove provided at an outer periphery of the annular frame 21.

The annular frame 21 includes a circular shape when viewed in a plan view. The fixing ring 23 which is coaxial with the annular frame 21 and which includes a through hole is arranged at a central region of the annular frame 21. The filter 22 is provided between an outer periphery of the fixing ring 23 and the annular frame 21. In the embodiment, the filter 22 is formed by being inserted when the annular frame 21 and the fixing ring 23 are formed by using metal die, however, the above-mentioned manufacturing method may be changed appropriately.

A retaining protrusion 19 is formed to protrude upwardly from a center of a bottom wall of the first water storage portion 16. The filtration unit F is fixed in a state where an upper end of the retaining protrusion 19 is inserted through the through hole of the fixing ring 23.

At the filtration unit F, the seal 21a of the outer periphery of the annular frame 21 is in closely contact with an inner periphery of the water storage wall 17, and thereby allowing the water flowing from the flow-down wall 14 to be reliably supplied to the filter 22.

(Second container) As illustrated in FIG. 2, the second container 30 is a bottomed cylindrical container including a fourth flange 30a formed at an opening end of the second container 30, and including a fifth flange 30b fixing the valve unit V to an outer periphery of a through hole provided at a cylindrical body portion of the second container 30. The second container 30 includes a circular cross section, for example. The second container 30 is made of resin. The second container 30 may be made of metal (metallic alloy) including aluminum, for example.

The second container 30 includes the second space portion Sb, wherein the fourth flange 30a and the third flange 15b of the lower housing 15 of the first container 10 are joined to each other with a bolt and/or a clamp to form the second space portion Sb. Each of the second introduction inlet 3 and the second discharge outlet 4 is in fluid communication with the second space portion Sb. A discharge flow passage 37 is in fluid communication with the second water storage portion 36. The discharge flow passage 37 is in fluid communication with the outside via the on-off valve 38 including, for example, an electromagnetic valve.

The second container 30 includes the second introduction inlet 3 and the second discharge outlet 4 that are arranged such that the second water storage portion 36 is interposed between the second introduction inlet 3 and the second discharge outlet 4 when viewed in a plan view (top view). The second introduction inlet 3 and the second discharge outlet 4 are formed so as to penetrate through a wall surface of a body portion 31 of the second container 30.

The second introduction inlet 3 is connected to an upstream-side second exhaust gas flow passage 55a of the second exhaust gas flow passage 55 which is connected to the cathode FCc (refer to FIG. 1). The second discharge outlet 4 is connected to a downstream-side second exhaust gas flow passage 55b of the second exhaust gas flow passage 55 which is connected to the humidifier 63. In the embodiment, a cross section of the flow passage of the second introduction inlet 3 and a cross section of the flow passage of the second discharge outlet 4 are arranged to overlap each other when viewed in a flow direction (an axial direction of the cross section of the flow passage of each of the second introduction inlet 3 and the second discharge outlet 4) of the second exhaust gas. The second exhaust gas flows through the second space portion Sb of the second container 30 since the second exhaust gas flow passage 55 is connected as described above. Accordingly, the parts and components provided or arranged in the second container 30 and the second space portion Sb are warmed or heated by the second exhaust gas.

In the embodiment, the second water storage portion 36 is a bottom portion of the second container 30, and serves as a container portion storing therein the water discharged from the drain port 18a of the drain pipe 18 and water separated from the second exhaust gas in a manner which will be described later. The second water storage portion 36 is the bottom portion of the second container 30 which surrounds a space region of the second space portion Sb of the second container 30, the space region which is positioned at a lower side than the second introduction inlet 3 and a lower side than the second discharge outlet 4 when viewed in the flow direction (a direction perpendicular to the cross section of the flow passage of the second introduction inlet 3) of the second exhaust gas flowing from the second introduction inlet 3 into the second space portion Sb of the second container 30. In the embodiment, the lower side than the second introduction inlet 3 when viewed in the flow direction of the second exhaust gas flowing from the second introduction inlet 3 into the second space portion Sb of the second container 30 is the same as the low side in the vertical direction and corresponds to a direction opposite to the first container 10 relative to the second introduction inlet 3.

The drain port 18a is arranged in the third space portion Sc surrounded by the second water storage portion 36 as described above. That is, the drain port 18a is arranged at a lower side than the second introduction inlet 3 and a lower side than the second discharge outlet 4 in the second space portion Sb of the second container 30, when viewed along the flow direction of the second exhaust gas flowing from the second introduction inlet 3 into the second space portion Sb of the second container 30. Accordingly, the water drained (flowing out) from the drain port 18a and the second exhaust gas introduced from the second introduction inlet 3 are avoided from colliding with each other, and thus it is effectively prevented that the water discharged from the drain port 18a is caught by the flow of the second exhaust gas introduced from the second introduction inlet 3 and thus flows out from the second discharge outlet 4 together with the second exhaust gas. The water discharged from the drain port 18a is stored in the second water storage portion 36.

Figure 6:
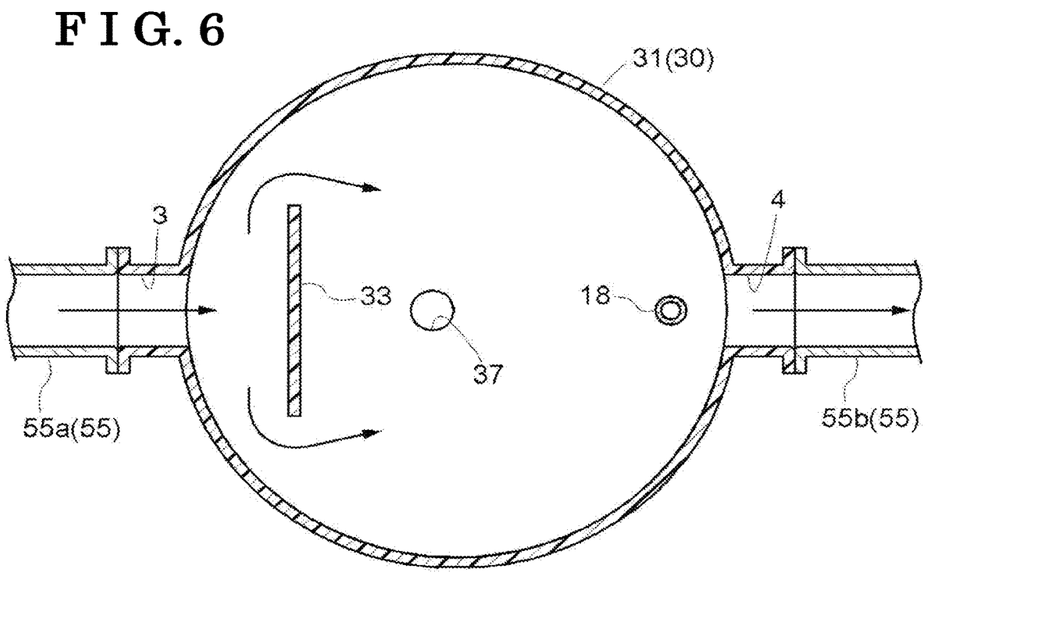
FIG. 6 is a transverse sectional view of a second container according to the embodiment.

As illustrated in FIGS. 2 and 6, the collision plate 33 (the example of the second separating portion) is arranged in the second space portion Sb of the second container 30 (refer to FIG. 2). The collision plate 33 includes a plate shape and allows the second exhaust gas supplied from the second introduction inlet 3 to collide with the collision plate 33. The collision plate 33 is provided to stand from the bottom surface of the second container 30 (the second water storage portion 36), for example. The collision plate 33 is arranged such that the plate surface of the collision plate 33 faces the second introduction inlet 3. The plate surface of the collision plate 33 is arranged to intersect with (to be orthogonal to, in the embodiment) the flow direction of the second exhaust gas flowing from the second introduction inlet 3 into the second space portion Sb of the second container 30, and thereby allowing the second exhaust gas to collide with the plate surface. In the embodiment, the collision plate 33, the drain pipe 18 and the second discharge outlet 4 are arranged in the stated order from the second introduction inlet 3 as being away from the second introduction inlet 3, when viewed in an extending direction of a perpendicular line to the cross section of the flow passage of the second introduction inlet 3. The flowing direction of the second exhausted gas is bent as the second exhaust gas collides with the collision plate 33.

By allowing the second exhaust gas supplied from the second introduction inlet 3 to collide with the collision plate 33, the liquid droplets included in the second exhaust gas are made to attach to the collision plate 33 as water droplets by the inertial collision, and thus are separated. The separated water is allowed to flow down from the collision plate 33 to the second water storage portion 36. The water that has flowed down to the second water storage portion 36 is temporarily stored in the second water storage portion 36. The water stored in the second water storage portion 36 is discharged to the outside from the discharge flow passage 37 when the on-off valve 38 is opened.

(Valve unit) As illustrated in FIGS. 2 and 5, the valve unit V is a unit that controls the water discharge from the discharge flow passage 17a to the drain pipe 18. The valve unit V includes the valve apparatus 7 opening and closing the discharge flow passage 17a and an actuator 6 (an example of a driving portion) of the valve apparatus 7. The valve unit V is fixed to the fifth flange 30b with, for example, a bolt.

The actuator 6 is the driving portion generating a driving force that opens and closes the valve apparatus 7 upon input of electric power. The actuator 6 includes a sixth flange 6d provided at an outer periphery of a casing of the actuator 6, an electromagnetic solenoid 6b, and a core 6a serving as a yoke gathering magnetic flux generated by the electromagnetic solenoid 6b. The sixth flange 6d of the actuator 6 is fixed to the fifth flange 30b with a bolt, for example. The actuator 6 is arranged at an outside of the first container 10 and an outside of the second container 30. Since the actuator 6 is arranged at the outside of the first container 10 and the outside of the second container 30, a problem is avoided that the driving force of the actuator 6 decreases as a result of an increase in electrical resistance due to a heated coil of the electromagnetic solenoid 6b heated by the heat of the exhaust gas.

The valve apparatus 7 includes a valve shaft 7a. A valve body 7b (an example of a valve) configured to close the discharge flow passage 17a is fixed to a distal end of the valve shaft 7a, the distal end which is at a side facing an exit 17b of the discharge flow passage 17a. The valve apparatus 7 includes a spring 7c biasing the valve shaft 7a towards the exit 17b. The valve shaft 7a is reciprocated by the magnetic flux generated at the electromagnetic solenoid 6b of the actuator 6.

The valve body 7b is a diaphragm-type valve that blocks or closes the discharge flow passage 17a (the exit 17b) when being pushed towards the exit 17b by the valve shaft 7a biased by the spring 7c (refer to FIG. 2). The valve body 7b moves away from the exit 17b as the valve shaft 7a moves away from the exit 17b against the spring force of the spring 7c due to the driving force of the actuator 6, thereby allowing the water to be discharged from the discharge flow passage 17a (refer to FIG. 5). The valve body 7b is arranged in the second container 30 to be positioned in a vicinity of the second space portion Sb. The valve shaft 7a and the spring 7c are arranged at the outside the first container 10 and the outside the second container 30.

In the explanation below, a state in which the valve body 7b of the valve apparatus 7 is separated from the exit 17b and thus the water discharge from the discharge flow passage 17a to the drain pipe 18 is allowed will be referred to as "open". When the valve apparatus 7 is open, the water stored in the first water storage portion 16 flows through the discharge flow passage 17a and is discharged from the exit 17b. The water discharged from the exit 17b is discharged via the drain pipe 18 to the second container 30, and then is stored in the second water storage portion 36. The water stored in the second water storage portion 36 is discharged to the outside from the discharge flow passage 37 when the on-off valve 38 is open as described above.

As described above, the gas and liquid separator disclosed here prevents the produced water from freezing and prevents the produced water from being discharged together with the exhaust gas from time to time when the exhaust gas is discharged.

(Other Embodiment)

(1) In the above-described embodiment, the actuator 6 includes the electromagnetic solenoid 6b and the core 6a, and is arranged outside the first container 10 and outside the second container 30. However, the arrangement of the actuator 6 is not limited thereto. Part of or whole of the actuator 6 may be accommodated inside the first container 10 or inside the second container 30.

(2) In the above-described embodiment, the valve body 7b is arranged in the vicinity of the second space portion Sb, in the second container 30, and the valve shaft 7a and the spring 7c are arranged outside the first container 10 and outside the second container 30. However, also the valve shaft 7a and the spring 7c may be arranged inside the second container 30 as well as the valve body 7b.

(3) In the above-described embodiment, the collision plate 33 includes the plate shape and is provided to stand from the bottom surface of the second container 30 in a manner that the plate surface of the collision plate 33 faces or opposes the second introduction inlet 3. The respective perpendicular lines to the cross sections of the flow passages of the second introduction inlet 3 and the second discharge outlet 4 are arranged to overlap with each other. However, the collision plate 33 may be provided in other manner than the state in which the collision plate 33 stands from the bottom surface of the second container 30.

The collision plate 33 may be supported at an inner side surface of the second container 30. For example, the collision plate 33 may be provided to stand form an inner wall surface of the body portion 31, the inner wall surface which follows along the flow direction of the second exhaust gas of each of the second introduction inlet 3 and the second discharge outlet 4. The collision plate 33 may be provided at the inner wall surface of the body portion 31, to which the second introduction inlet 3 and the second discharge outlet 4 are connected, in a manner that the collision plate 33 is supported by, for example, a columnar support and faces a front side of the flow direction of the second exhaust gas. The collision plate 33 may be provided to hang down, that is, to extend downwardly, from a bottom surface of the lower housing 15 (for example, the water storage wall 17).

The collision plate 33 may include plural pieces of collision plates.

Figure 7:
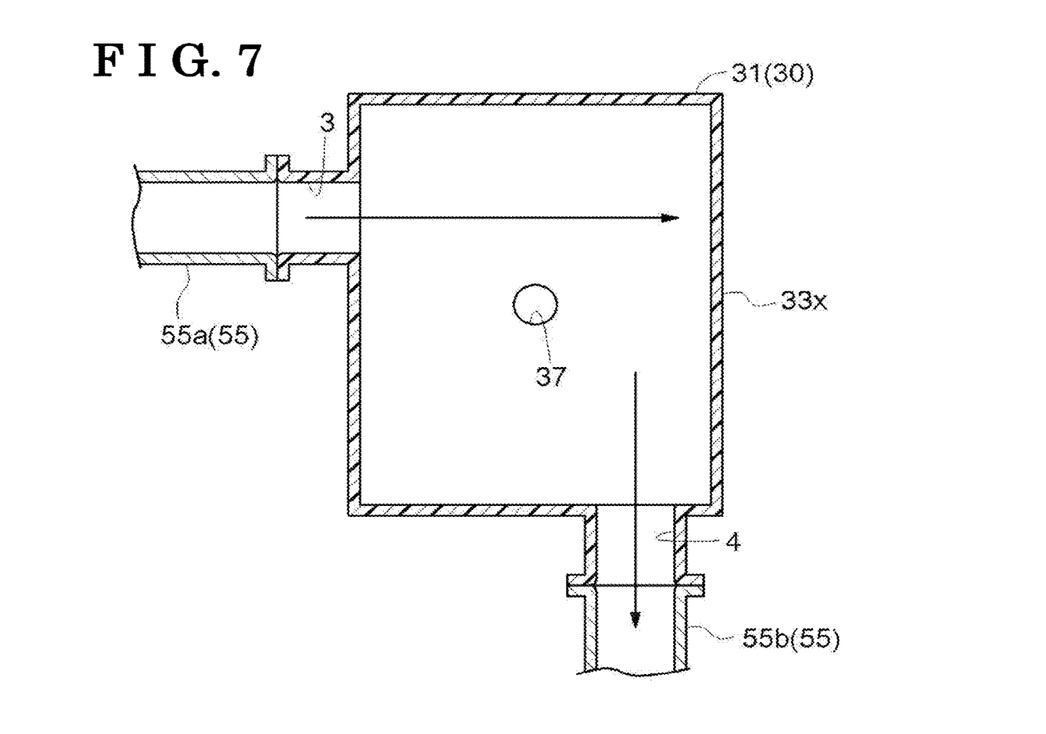
FIG. 7 is a transverse sectional view of the second container according to another embodiment.

Instead of the collision plate 33, part of a side wall of the second container 30 may serve as a collision plate 33x provided to face or oppose the second introduction inlet 3 as illustrated in FIG. 7. In this case, the flow direction of the second exhaust gas of the second introduction inlet 3 and the flow direction of the second exhaust gas of the second discharge outlet 4 are configured to intersect with each other (to be orthogonal to each other in the example illustrated in FIG. 7). By allowing the second exhaust gas to collide with the collision plate 33x, the liquid droplets included in the second exhaust gas are separated and made to flow down to the second water storage portion 36 to be stored therein in a similar manner to the example in which the collision plate 33 is used, and then are discharged to the outside via the on-off valve 38 and the discharge flow passage 37, in a similar manner to the above-described embodiment.

Figure 8:
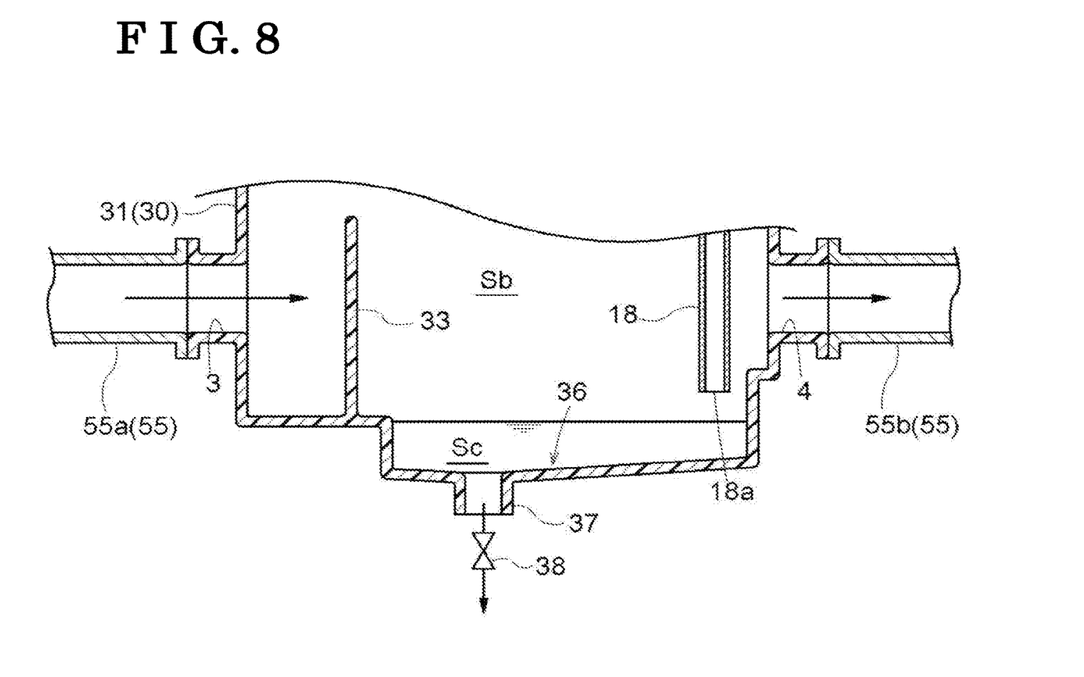
FIG. 8 is a longitudinal sectional view of the second container according to another embodiment.

(4) In the above-described embodiment, the second water storage portion 36 corresponds to the bottom portion of the second container 30. However, the disclosure is not limited to the example in which the second water storage portion 36 is the bottom portion of the second container 30. As illustrated in FIG. 8, the second water storage portion 36 may correspond to part of the bottom portion of the second container 30 instead of the whole of the bottom portion of the second container 30. In FIG. 8, the second water storage 36 is formed at a lower side of a rear surface side (a surface opposite to the surface facing the second introduction inlet 3) of the collision plate 33 in such a manner that a part of a bottom plate of the second container 30 is recessed from a side of the third space portion Sc (i.e., the internal space portion) towards the outside. In this case, the water flowing beside the collision plate 33 and/or the water flows over above the collision plate 33 is stored in the second water storage portion 36. The water stored in the second water storage portion 36 is discharged to the outside from the on-off valve 38 and the discharge flow passage 37 in a similar manner to the above-described embodiment.

In FIG. 8, the collision plate 33 is provided to stand from the bottom surface of the second container 30, the bottom surface which is other than the bottom surface of the second water storage portion 36, however, the collision plate 33 may be provided to stand from the bottom surface of the second water storage portion 36.

(5) In the above-described embodiment, in the second space portion Sb of the second container 30, the drain port 18a of the drain pipe 18 is arranged to be low relative to the second introduction inlet 3 and low relative to the second discharge outlet 4 when viewed in the direction in which the second exhaust gas flows from the second introduction inlet 3 into the second space portion Sb of the second container 30. However, the arrangement of the drain port 18a is not limited to the above-described example.

Figure 9:
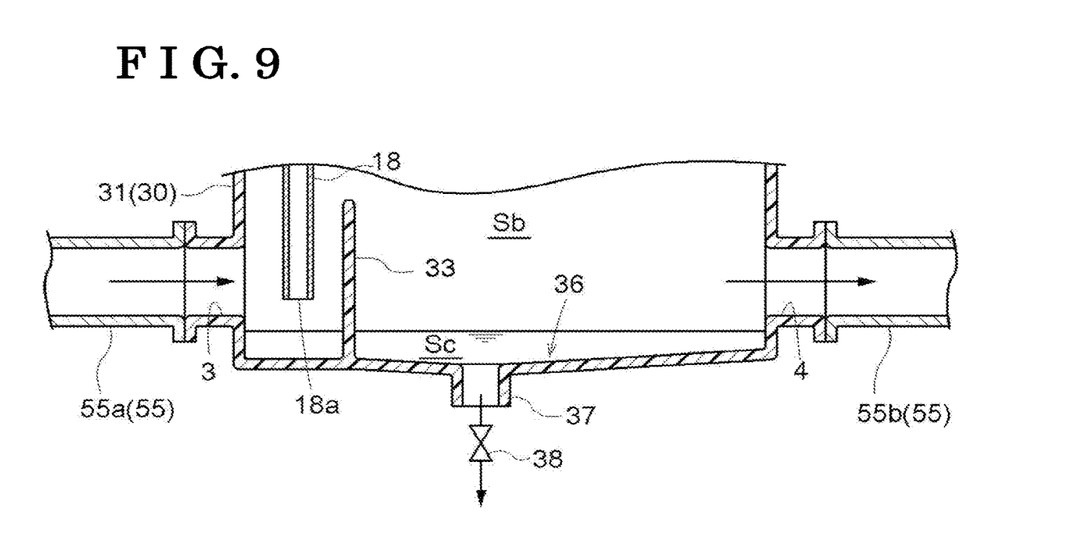
FIG. 9 is a longitudinal sectional view of the second container according to another embodiment.

As illustrated in FIG. 9, the drain port 18a of the drain pipe 18 may be arranged to overlap with the second introduction inlet 3 and/or overlap with the second discharge outlet 4 when viewed in the flow direction (an extending direction of a perpendicular line relative to the cross section of the flow path of the second introduction inlet 3) of the second exhaust gas flowing from the second introduction inlet 3 into the second space portion Sb of the second container 30. The drain port 18a of the drain pipe 18 may be arranged to be higher than the second introduction inlet 3 and/or higher than the second discharge outlet 4.

(6) In the above-described embodiment, the collision plate 33, the drain pipe 18 and the second discharge outlet 4 are arranged in the stated order from the second introduction inlet 3 in the direction away from the second introduction inlet 3 when viewed in the extending direction of a perpendicular line relative to the cross section of the flow passage of the second introduction inlet 3. The arrangement of the drain pipe 18, however, is not limited thereto.

As illustrated in FIG. 9, the drain pipe 18, the collision plate 33, and the second discharge outlet 4 may be arranged in the stated order from the second introduction inlet 3 when viewed in the extending direction of a perpendicular line relative to the cross section of the flow passage of the second introduction inlet 3.

(7) In the above-described embodiment, the drain port 18a of the drain pipe 18 is arranged at a lower side than the second introduction inlet 3 and a lower side than the second discharge outlet 4 in the second space portion Sb of the second container 30 when viewed in the flow direction of the second exhaust gas flowing from the second introduction inlet 3 into the second space portion Sb of the second container 30 (in the extending direction of a perpendicular line that is perpendicular to the cross section of the flow passage of the second introduction inlet 3). In the above-described embodiment, the collision plate 33, the drain pipe 18, and the second discharge outlet 4 are arranged in the stated order from the second introduction inlet 3 when viewed in the extending direction of a perpendicular line relative to the cross section of the flow passage of the second introduction inlet 3. However, the arrangements of the drain pipe 18 and/or the drain port 18a are not limited to thereto.

As illustrated in FIG. 9, the drain pipe 18 (the drain port 18a), the collision plate 33, and the second discharge outlet 4 may be arranged in the stated order from the second introduction inlet 3 when viewed in the extending direction of a perpendicular line relative to the cross section of the flow passage of the second introduction inlet 3. The drain port 18a may be arranged to overlap with the second introduction inlet 3 and/or overlap with the second discharge outlet 4 when viewed in the flow direction of the second exhaust gas flowing from the second introduction inlet 3 into the second space portion Sb of the second container 30 (the extending direction of a perpendicular line relative to the cross section of the flow passage of the second introduction inlet 3). The drain port 18a may be arranged to be higher than the second introduction inlet 3 and/or higher than the second discharge outlet 4.

By arranging the drain pipe 18 and/or the drain port 18a as described above, most of the water discharged from the drain port 18a flows down to the second water storage portion 36 as it is. Part of the water discharged from the drain port 18a might be caught in the flow of the second exhaust gas and flows together with the second exhaust gas, but the water eventually collides with the collision plate 33 and then flows down to the second water storage portion 36. Thus, the water discharged from the drain port 18a is effectively prevented from flowing out from the second discharge outlet 4.

The structures and configurations disclosed in the above-described embodiment (including the other embodiments, the same applies hereafter) are applicable by being combined with structures and configurations disclosed in still other embodiment within a range that does not cause any conflicts or contradictions. The embodiments disclosed here are examples and the scope of the present disclosure is not limited to these embodiments. The embodiments of the present disclosure may be appropriately changed or modified without departing from the object of the present disclosure.

The present disclosure is applicable to a gas and liquid separator for a fuel cell system to be mounted on, for example, a vehicle.

According to the aforementioned embodiment, a gas and liquid separator A includes a first gas and liquid separating portion (i.e., a first separating portion) 13 configured to separate a liquid droplet from a first exhaust gas discharged from an anode (i.e., a negative electrode) FCa of a fuel cell FC, a first container 10 accommodating the first gas and liquid separating portion 13 in a first space portion Sa (i.e., an internal space portion), a first storage reservoir 16 provided at a lower portion of the first container 10 and storing water flowing down from the first gas and liquid separating portion 13, a second container 30 provided at a lower side of the first storage reservoir 16 to be adjacent to the first storage reservoir 16, a second water storage portion (i.e., a second storage reservoir) 36 provided at a lower portion of the second container 30, and a valve apparatus 7 including a valve body (i.e., a valve) 7b discharging water stored in the first storage reservoir 16 when the valve body 7b is open, wherein a second exhaust gas discharged from a cathode (i.e., a positive electrode) FCc of the fuel cell FC flows in a second space portion (i.e., an internal space portion) Sb of the second container 30, and water discharged from the first storage reservoir 16 is stored in the second water storage portion 36.

According to the above-described configuration, liquid droplets in which the produced water or generated water included in the first exhaust gas (so-called anode off-gas) discharged from the anode FCa (i.e., the negative electrode) of the fuel cell FC are separated by the first gas and liquid separating portion 13. Thereafter, the water, which is the liquid droplet separated at the first gas and liquid separating portion 13, flows down to the first water storage portion 16 of the first container 10, and is discharged to the second water storage portion 36 of the second container 30 and is stored.

According to the above-described configuration, the second exhaust gas (so-called cathode off-gas) discharged from the cathode FCc flows in the second container 30. Thus, the heat of the second exhaust gas heats or warms the second container 30 and the second space portion Sb of the second container 30. According to the above-described configuration, the second container 30 is provided at the lower side of the first storage reservoir 16 to be adjacent to the first storage reservoir 16, and the first storage reservoir 16 is heated or warmed by the heat of the second exhaust gas. In a case where the water stored in the first storage reservoir 16 and/or the water around the valve body 7b freezes when the fuel cell FC stops operating, the frozen water is heated by the second exhaust gas as the fuel cell FC starts operating and then melts immediately. Consequently, the water is discharged by the valve apparatus 7 from the first storage reservoir 16 with no trouble.

According to the above-described configuration, the discharged water discharged by the valve apparatus 7 from the first storage reservoir 16 (which may be simply referred to as the discharged water) is stored or retained in the second water storage portion 36. Thus, the discharged water does not move together with the second exhaust gas and thus does not flow out to a downstream of the second container 30 as it is. Consequently, the discharge water is not discharged outside from time to time. Further, the discharged water does not collide with a turbine, for example, provided on the downstream of the second container 30.

Thus, according to the gas and liquid separator A including the above-described configuration, the produced or generated water (the discharged water) of the fuel cell FC is prevented from freezing and the produced water is prevented from being discharged together with the exhaust gas from time to time.

According to the above-described configuration, at the gas and liquid separator A, it is prevented that the produced water of the fuel cell FC freezes and that the produced water is discharged from time together with the exhaust gas.

According to the aforementioned embodiment, the gas and liquid separator A includes an actuator (i.e., a driving portion) 6 configured to open and close the valve apparatus 7, the valve body 7b being arranged in a vicinity of the second space portion Sb of the second container 30, and the actuator 6 being arranged outside the first container 10 and outside the second container 30.

According to the above-described configuration, the water around the valve body 7b of the valve apparatus 7 is heated or warmed by the second exhaust gas, thereby causing no problem in opening and closing the valve body 7b. Even in a case where the valve apparatus 7 is opened and closed by a driving portion, such as a solenoid actuator, which should not involve in heating or warming for generating heat, only the valve body 7b is heated to prevent the freezing and the driving portion 6 is avoided from being overheated.

According to the aforementioned embodiment, the gas and liquid separator A includes a drain pipe 18 in which the water discharged from the first storage reservoir 16 via the valve apparatus 7 flows, the drain pipe 18 being exposed to the second space portion Sb of the second container 30, a drain port 18a of the drain pipe 18 being accommodated in a third space portion (i.e., an internal space portion) Sc of the second water storage portion 36.

According to the above-described configuration, the drain pipe 18 is accommodated in a state of being exposed to the third space portion Sc of the second container 30 and is warmed by the heat of the second exhaust gas. Thus, the water existing in the drain pipe 18 is prevented from freezing. If the water inside the drain pipe 18 freezes while the fuel cell FC is stopped its operation, the water is immediately heated by the second exhaust gas and then melts in association with the start of operation of the fuel cell FC. Consequently, the valve apparatus 7 has no problem in discharging the water from the first water storage portion 16.

According to the above-described configuration, the drain port 18a (when the valve apparatus 7 is positioned at one side of the drain pipe 18, the drain port 18a is positioned at the other side of the drain pipe 18) of the drain pipe 18 is accommodated in the third space portion Sc of the second water storage portion 36, and thus the water inside the drain pipe 18 is discharged directly into the second water storage portion 36. Accordingly, the discharged water does not accompany the second exhaust gas and does not flow out to the downstream of the second container 30 together with the second exhaust gas, and thus the discharged water does not drain outside as it is. Further, the discharged water does not collide with a turbine that might be provided on the downstream of the second container 30, for example.

According to the aforementioned embodiment, the second container 30 includes a second introduction inlet (i.e., an introduction port) 3 of the second exhaust gas and a second discharge outlet (i.e., a discharge port) 4 of the second exhaust gas, and the drain port 18a is arranged at a lower side than the second introduction inlet 3 and a lower side than the second discharge outlet 4, when viewed along a flow direction of the second exhaust gas.

According to the above-described configuration, because the drain port 18a of the drain pipe 18 is arranged at the lower side than the second introduction inlet 3 and the lower side than the second discharge outlet 4 when viewed along the flow direction of the second exhaust gas in the second container 30, the discharged water does not flow out to the downstream of the second container 30 by accompanying the second exhaust gas. Thus, the discharged water is not discharged as it is to the outside. Further, the discharged water does not collide with a turbine, for example, provided on the downstream of the second container 30.

According to the aforementioned embodiment, the second container 30 accommodates therein a collision plate (i.e., a second separating portion) 33 configured to separate water included in the second exhaust gas and allow the separated water to flow down to the second water storage portion 36.

According to the above-described configuration, a liquid droplet (water) included in the second exhaust gas is separated and stored in the second water storage portion 36. Thus, the liquid droplets included in the second exhaust gas do not flow out to the downstream of the second container 30 as it is. That is, the liquid droplets included in the second exhaust gas do not drain outside as it is, and the liquid droplets do not collide with, for example, a turbine provided on the downstream of the second container 30.

According to the aforementioned embodiment, the second separating portion includes a collision plate 33, 33x configured to bend a flowing direction of the second exhaust gas flowing within the second space portion Sb of the second container 30.

According to the above-described configuration, the liquid droplet included in the second exhaust gas is made to attach, as the water droplet, to the collision plate 33, 33x due to the inertial collision, and thus the liquid droplet is separated. The separated water falls off the collision plate 33, 33x downwardly and then is stored in the second water storage portion 36.

The principles, preferred embodiments and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A gas and liquid separator comprising:
   a first separating portion configured to separate a liquid droplet from a first exhaust gas discharged from a negative electrode of a fuel cell;
   a first container accommodating the first separating portion in an internal space portion;
   a first storage reservoir provided at a lower portion of the first container and storing water flowing down from the first separating portion;
   a second container provided at a lower side of the first storage reservoir to be adjacent to the first storage reservoir, the second container including an internal space portion;
   a second storage reservoir provided at a lower portion of the second container; and
   a valve apparatus including a valve discharging the water stored in the first storage reservoir when the valve is open, wherein
   a second exhaust gas discharged from a positive electrode of the fuel cell flows in the internal space portion of the second container,
   the water discharged from the first storage reservoir is stored in the second storage reservoir, and
   the valve apparatus includes a driving portion configured to open and close the valve apparatus, the driving portion being arranged between the first container and the second container, and the driving portion being arranged outside the first container and outside the second container.

2. The gas and liquid separator according to claim 1, wherein the second container accommodates therein a second separating portion configured to separate water included in the second exhaust gas and allow the separated water to flow down to the second storage reservoir.

3. The gas and liquid separator according to claim 2, wherein the second separating portion includes a collision plate configured to bend a flowing direction of the second exhaust gas flowing in the internal space portion of the second container.

4. The gas and liquid separator according to claim 1, further comprising:
   a drain pipe in which the water discharged from the first storage reservoir via the valve apparatus flows;
   the drain pipe being exposed to the internal space portion of the second container; and
   a drain port of the drain pipe being accommodated in an internal space portion of the second storage reservoir.

5. The gas and liquid separator according to claim 4, wherein
   the second container includes an introduction port of the second exhaust gas and a discharge port of the second exhaust gas, and
   the drain port is arranged at a lower side than the introduction port and a lower side than the discharge port, when viewed along a flow direction of the second exhaust gas.

\* \* \* \* \*